United States Patent
Takehara et al.

(10) Patent No.: US 10,580,297 B2
(45) Date of Patent: Mar. 3, 2020

(54) REVERSE TRAVELLING PREVENTING DEVICE AND REVERSE TRAVELLING PREVENTING SYSTEM

(71) Applicant: Mitsubishi Electric Corporation, Tokyo (JP)

(72) Inventors: Takayoshi Takehara, Tokyo (JP); Keisuke Morita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 196 days.

(21) Appl. No.: 15/623,488

(22) Filed: Jun. 15, 2017

(65) Prior Publication Data
US 2018/0253969 A1 Sep. 6, 2018

(30) Foreign Application Priority Data

Mar. 3, 2017 (JP) ................................. 2017-040053

(51) Int. Cl.
*G08G 1/0967* (2006.01)
*G08G 1/16* (2006.01)
(Continued)

(52) U.S. Cl.
CPC ....... *G08G 1/096725* (2013.01); *B60Q 9/008* (2013.01); *B60W 30/18036* (2013.01);
(Continued)

(58) Field of Classification Search
CPC .. G08G 1/096725; G08G 1/162; G08G 1/166; B60Q 9/008
See application file for complete search history.

(56) References Cited

U.S. PATENT DOCUMENTS

2012/0197873 A1* 8/2012 Uramoto ............... H04W 4/021
707/722
2012/0323476 A1* 12/2012 Funabashi ............ G08G 1/0112
701/300
(Continued)

FOREIGN PATENT DOCUMENTS

JP          2012-038024 A      2/2012
JP          2013-005186 A      1/2013
(Continued)

OTHER PUBLICATIONS

Machine Translation of JP 2014-063239 (Year: 2012).*
Communication dated Dec. 5, 2017 from the Japanese Patent Office in counterpart Application No. 2017-040053.

*Primary Examiner* — Alan D Hutchinson
(74) *Attorney, Agent, or Firm* — Sughrue Mion, PLLC; Richard C. Turner

(57) ABSTRACT

In order to report, immediately and over a broad range, that a reversely travelling moving object is approaching, a reverse travelling preventing device according to the present invention includes: a reverse travelling detection unit which detects reverse travelling information about travelling of the own vehicle; an inter-vehicle communication signal transmission unit which transmits reverse travelling information to another moving object on the basis of output from the reverse travelling detection unit; an inter-vehicle communication signal reception unit which receives transmitted reverse travelling information; an inter-vehicle communication signal transfer unit which transfers the reverse travelling information to another moving object; and a control signal output unit which, on the basis of the transmitted or received reverse travelling information, displays the reverse travelling information and controls operation of the moving object.

12 Claims, 12 Drawing Sheets

(51) Int. Cl.
*B60Q 9/00* (2006.01)
*B60W 30/18* (2012.01)
*B60W 50/14* (2012.01)
*B60W 40/00* (2006.01)
*H04W 84/18* (2009.01)
*B60Q 1/22* (2006.01)

(52) U.S. Cl.
CPC ............ *B60W 40/00* (2013.01); *B60W 50/14* (2013.01); *G08G 1/09675* (2013.01); *G08G 1/096741* (2013.01); *G08G 1/096791* (2013.01); *G08G 1/162* (2013.01); *G08G 1/166* (2013.01); *B60Q 1/22* (2013.01); *B60W 2050/146* (2013.01); *B60W 2550/402* (2013.01); *B60W 2550/408* (2013.01); *H04W 84/18* (2013.01)

(56) References Cited

U.S. PATENT DOCUMENTS

2016/0343253 A1   11/2016  Imai
2017/0368893 A1*  12/2017  Kodama ................ B60C 23/04
2018/0056999 A1*   3/2018  Damiani ............... B60W 30/16

FOREIGN PATENT DOCUMENTS

JP       2014-063239 A    4/2014
JP       2015-121952 A    7/2015

\* cited by examiner

REVERSE TRAVELLING PREVENTING DEVICE AND REVERSE TRAVELLING PREVENTING SYSTEM

BACKGROUND OF THE INVENTION

1. Field of the Invention

The present invention relates to a reverse travelling preventing device and a reverse travelling preventing system for preventing accident due to reverse travelling of a moving object.

2. Description of the Background Art

One of conventional reverse travelling preventing devices for a moving object is configured to, when reverse travelling of a moving object is detected, transmit the present position thereof and reverse travelling information to another moving object and receive reverse travelling information including the present position of another moving object, thereby reporting the reverse travelling information (see Japanese Laid-Open Patent Publication No. 2014-63239).

The conventional reverse travelling preventing device as described above can transmit the reverse travelling information to a nearby moving object, but has a problem that it is impossible to report immediately that the reversely travelling moving object is approaching, to other moving objects over a broad range that are travelling around the reversely travelling moving object.

SUMMARY OF THE INVENTION

The present invention has been made to solve the above problem, and an object of the present invention is to provide a reverse travelling preventing device and a reverse travelling preventing system for reporting, immediately and over a broad range, that a reversely travelling moving object is approaching.

A reverse travelling preventing device according to the present invention includes: a reverse travelling detection unit which detects that an own vehicle is travelling reversely, on the basis of road map information and information about change in a present position of the own vehicle; an inter-vehicle communication signal transmission unit which transmits reverse travelling information of the own vehicle to another vehicle when the reverse travelling detection unit has detected reverse travelling; a control signal output unit which, on the basis of output from the reverse travelling detection unit, generates a control signal and controls a display and a vehicle drive unit; an inter-vehicle communication signal reception unit which receives reverse travelling information from another vehicle; an inter-vehicle communication signal transfer unit which transfers information indicating that the other vehicle is travelling reversely, on the basis of output from the inter-vehicle communication signal reception unit; and a control signal output unit which, on the basis of output from the inter-vehicle communication signal reception unit, generates a control signal and controls the display and the vehicle drive unit.

The reverse travelling preventing device and reverse travelling preventing system according to the present invention are capable of reporting, immediately and over a broad range, that a reversely travelling moving object is approaching, and thus can prevent occurrence of an accident.

The foregoing and other objects, features, and advantageous effects of the present invention will become more apparent from detailed description in the following embodiments and description in the accompanying drawings.

DETAILED DESCRIPTION OF THE PREFERRED EMBODIMENTS OF THE INVENTION

First Embodiment

Hereinafter, the present invention will be described with reference to the drawings.

Figure 1:
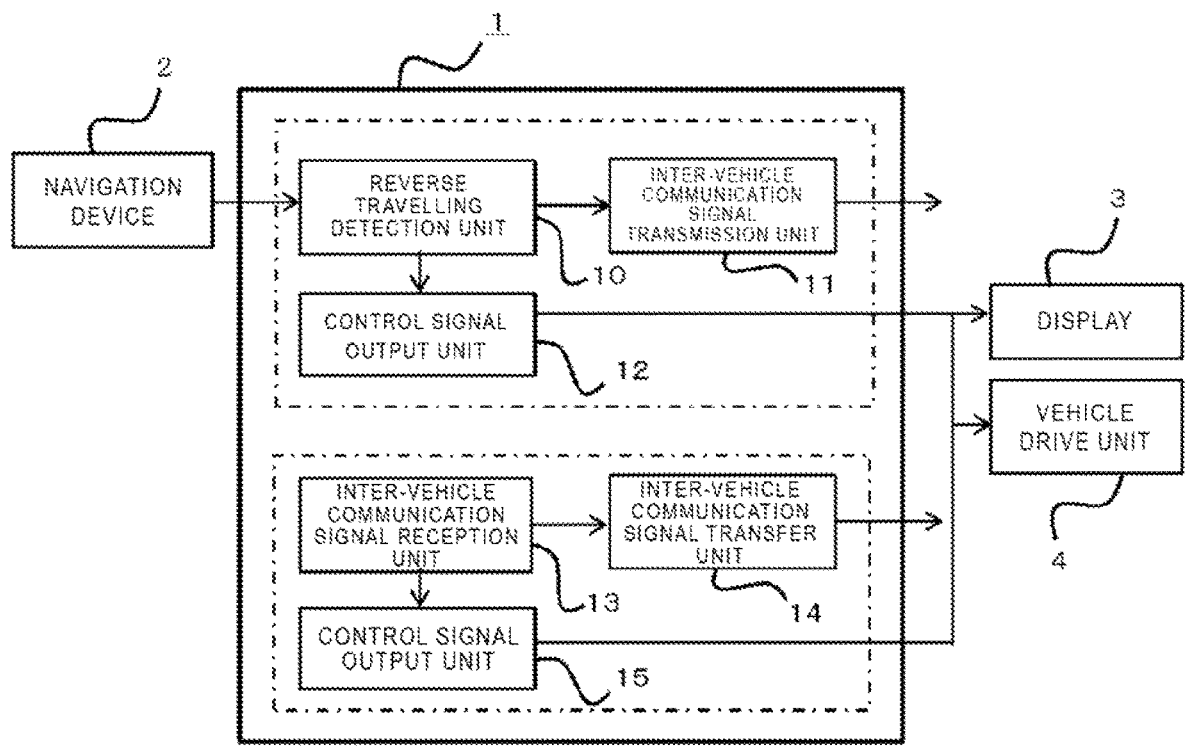
FIG. 1 is a block diagram showing a schematic configuration of a reverse travelling preventing device according to the first embodiment of the present invention.

FIG. 1 is a block diagram showing a schematic configuration of a reverse travelling preventing device according to the first embodiment of the present invention.

In FIG. 1, a moving object information communication device 1 which is a major part of a reverse travelling preventing device mounted on a moving object, e.g., an automobile, includes: a reverse travelling detection unit 10 which, on the basis of information from a navigation device 2, detects that, for example, the own vehicle is travelling in a direction reverse to a travelling direction set by the law for a main line of an expressway or the entrance/exit of an expressway; an inter-vehicle communication signal transmission unit 11 which transmits, to another vehicle, information (reverse travelling information) indicating that the own vehicle is reversely travailing, when the reverse travelling detection unit 10 has detected the reverse travelling of the own vehicle; a control signal output unit 12 which generates a control signal on the basis of output from the reverse travelling detection unit 10, to control a display 3 and a vehicle drive unit 4; an inter-vehicle communication signal reception unit 13 which receives reverse travelling information from another vehicle; an inter-vehicle communication signal transfer unit 14 which, on the basis of output from the inter-vehicle communication signal reception unit 13, transfers information indicating that the other vehicle is travelling reversely, to a third-party other vehicle; and a control signal output unit 15 which generates a control signal on the basis of output from the inter-vehicle communication signal reception unit 13, to control the display 3 and the vehicle drive unit 4.

Figure 2:
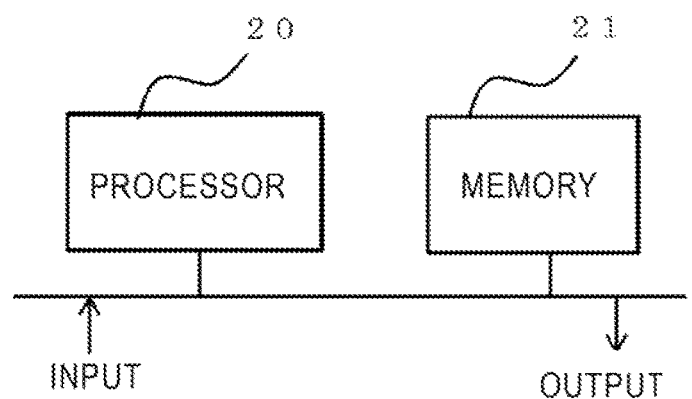
FIG. 2 is a block diagram showing the hardware configuration of the reverse travelling preventing device according to the first embodiment of the present invention.

Here, the components of the moving object information communication device 1 are formed by, for example, a microprocessor 20 and a memory 21 storing a program and various information, as shown in FIG. 2. The navigation device 2 has, in general, a function of detecting road map information and the present position indicating where one own vehicle is travelling, and displaying the present position information on a road map.

Figure 3:
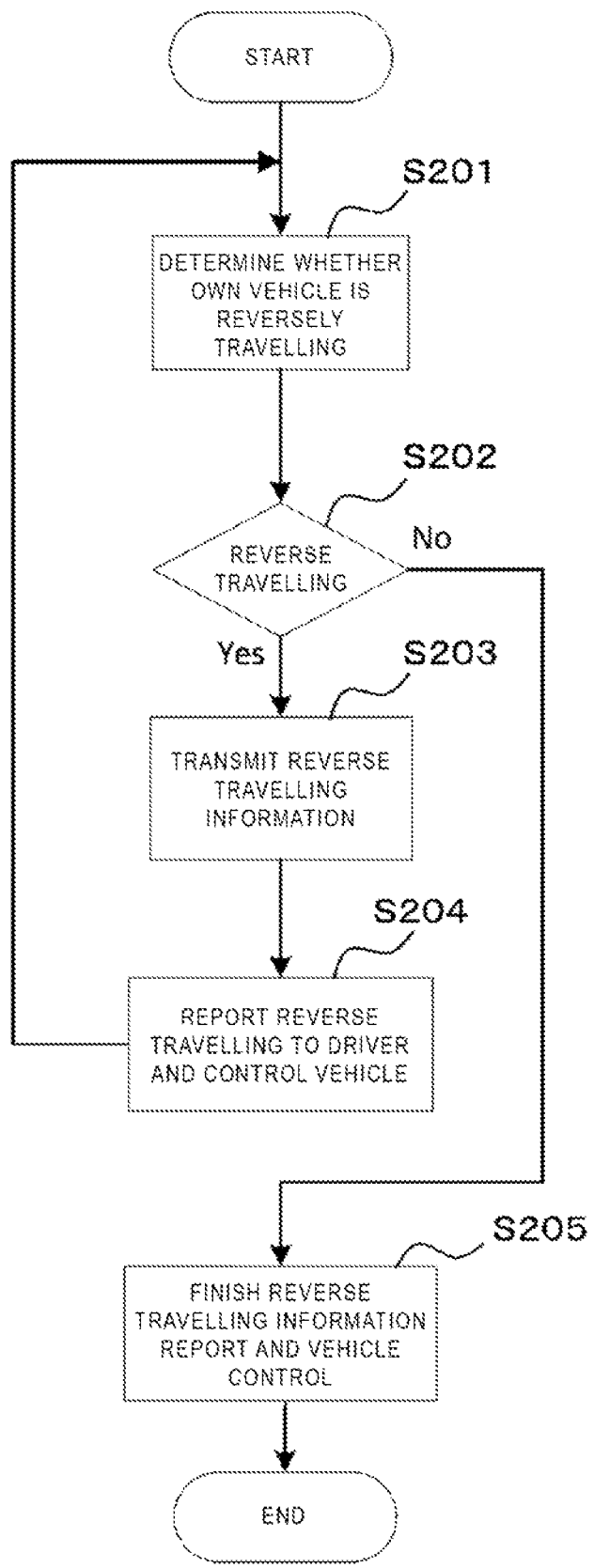
FIG. 3 is a flowchart for explaining operation of the reverse travelling preventing device according to the first embodiment of the present invention.

Next, operation of the reverse travelling preventing device configured as described above will be described with reference to a flowchart in FIG. 3.

In step S201, the reverse travelling detection unit 10 determines whether or not the own vehicle is travelling reversely, on the basis of the road map information and information about change in the present position of the own vehicle in the navigation device 2.

Here, if the reverse travelling detection unit 10 determines that the own vehicle is travelling reversely (step S202), the process proceeds to step S203 and the inter-vehicle communication signal transmission unit 11 transmits, to another vehicle, information indicating that the own vehicle is travelling reversely.

Next, in step S204, the control signal output unit 12 outputs a signal indicating reverse travelling information, to the display 3, to notify a driver of the own vehicle, and controls the vehicle drive unit 4 to stop or decelerate the vehicle, so as to avoid a risk of collision or the like.

Thereafter, the process returns to step S201 to repeat the reverse travelling determination operation.

On the other hand, in step S202, if the reverse travelling detection unit 10 determines that the own vehicle is not travelling reversely, the process proceeds to step S205 and the control signal output unit 12 stops the output signal, to stop operation of the display 3, and controls the vehicle drive unit 5 to keep a normal driving state.

Figure 4:
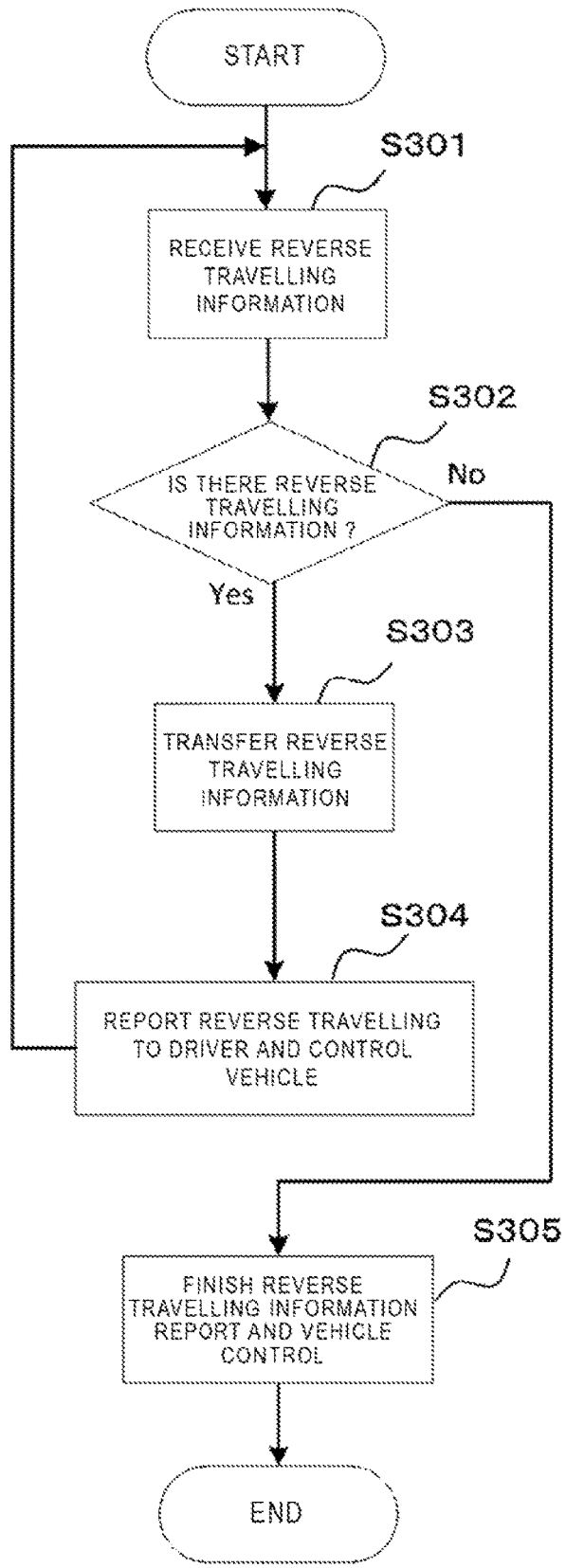
FIG. 4 is a flowchart for explaining another operation of the reverse travelling preventing device according to the first embodiment of the present invention.

Next, the case where another vehicle is travelling reversely will be described with reference to a flowchart in FIG. 4.

First, when another vehicle is travelling reversely, in step S301, the inter-vehicle communication signal reception unit 13 of the own vehicle receives reverse travelling information transmitted from the inter-vehicle communication signal transmission unit 11 of the other vehicle, and determines whether or not there is reverse travelling information (step S302). Here, if the inter-vehicle communication signal reception unit 13 determines that there is reverse travelling information, the process proceeds to step S303 and the inter-vehicle communication signal transfer unit 14 transfers, to a third-party other vehicle, information indicating that the other vehicle is travelling reversely. Then, the process proceeds to step S304.

Next, in step S304, the control signal output unit 15 outputs a signal indicating the reverse travelling information, to the display 3, to notify a driver of the own vehicle, and controls the vehicle drive unit 4 to stop or decelerate the vehicle, so as to avoid a risk of collision or the like.

Thereafter, the process returns to step S301 to repeat operation from step S301 to step S304.

On the other hand, in step 3302, if the inter-vehicle communication signal reception unit 13 determines that there is no reverse travelling information, the process proceeds to step S305 and the control signal output unit 15 stops the output signal, to stop operation of the display 3, and controls the vehicle drive unit 4 to keep a normal driving state.

The above steps are repeatedly executed by the microprocessor 20 every predetermined time.

As described above, when it is detected that the own vehicle is travelling reversely, reverse travelling information is transmitted and the travelling of the own vehicle is controlled, and when reverse travelling information is received from another vehicle, the own vehicle is controlled on the basis of the reverse travelling information, and the reverse travelling information is transferred to a third-party other vehicle, whereby it is possible to prevent occurrence of an accident on travelling vehicles over a broad range.

The necessity for transferring the received reverse travelling information to a third-party vehicle as described above is based on the following reason.

Normally, on an expressway, walls, buildings, trees, and the like are present adjacently. When the vehicle is travelling in such a place or when a large truck is travelling near the vehicle, if inter-vehicle communication is performed wirelessly, there is a possibility that information transmission by the inter-vehicle communication cannot sufficiently be performed because those objects serve as barriers. Therefore, by transferring the received reverse travelling information to other vehicles, it is possible to cause a plurality of vehicles over a broad range to transmit the information, thereby enabling establishment of an effective reverse travelling preventing system.

Second Embodiment

Figure 5:
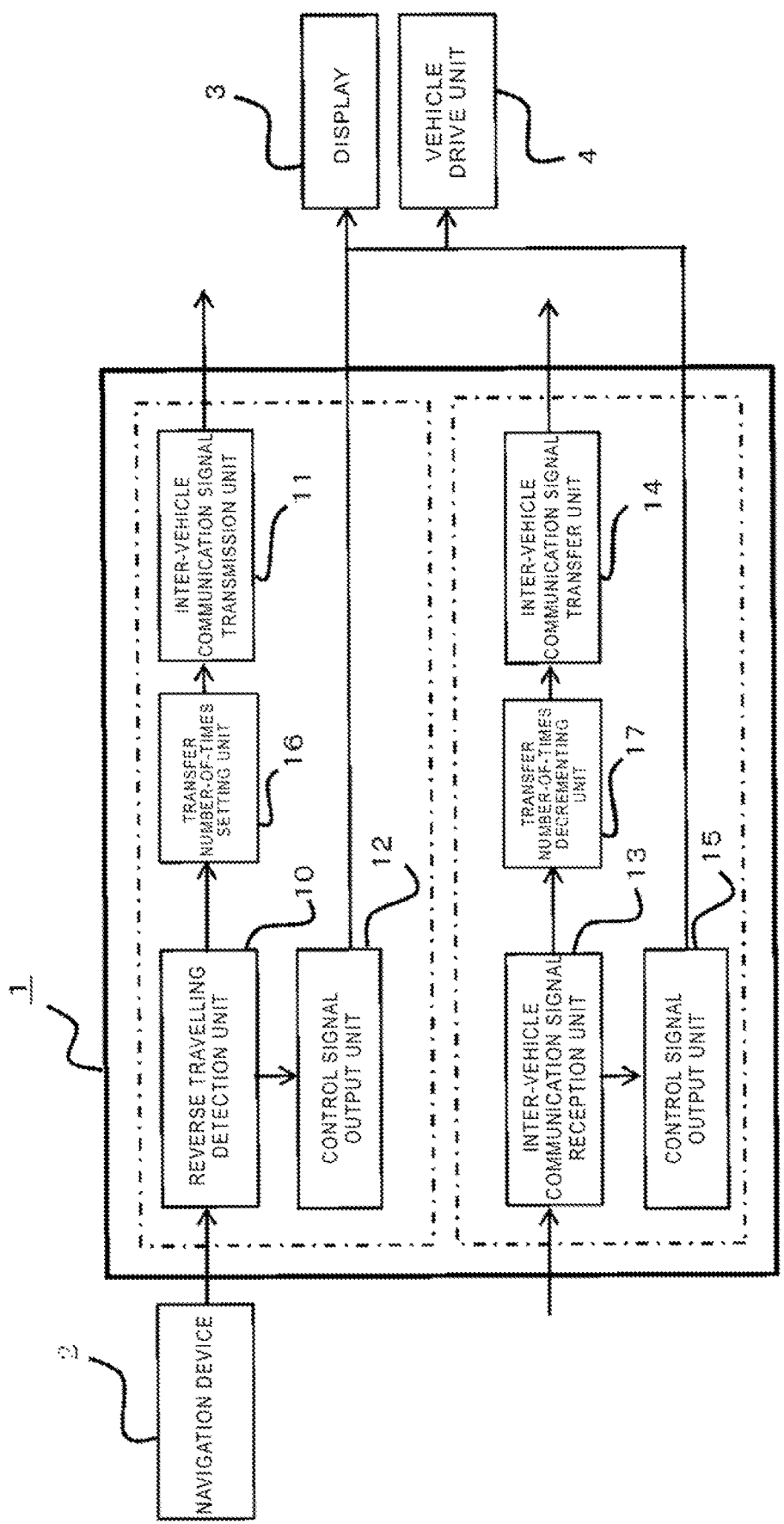
FIG. 5 is a block diagram showing a schematic configuration of a reverse travelling preventing device according to the second embodiment of the present invention.

FIG. 5 is a block diagram showing a schematic configuration of a reverse travelling preventing device according to the second embodiment of the present invention.

In FIG. 5, the same components as those in FIG. 1 are denoted by the same reference characters, and the description thereof is omitted.

In the second embodiment, a transfer number-of-times setting unit 16 is provided which sets the number of times of transfer at a predetermined value (for example, three times) in advance when the reverse travelling detection unit 10 has detected reverse travelling, and information about the number of times of transfer is transmitted in addition to the reverse travelling information to be transmitted from the inter-vehicle communication signal transmission unit 11. In addition, in the second embodiment, a transfer number-of-times decrementing unit 17 is provided which, when the inter-vehicle communication signal reception unit 13 has received reverse travelling information from another vehicle, acquires information about the number of times of transfer from the reverse travelling information and decrements the number of times of transfer by 1. Whether or not transfer is needed is determined on the basis of the information about the number of times of transfer, and the inter-vehicle communication signal transfer unit 14 transfers the information about the number of times of transfer in addition to the reverse travelling information.

Next, operation of the reverse travelling preventing device configured as described above will be described with reference to FIG. 6 and FIG. 7.

Figure 6:
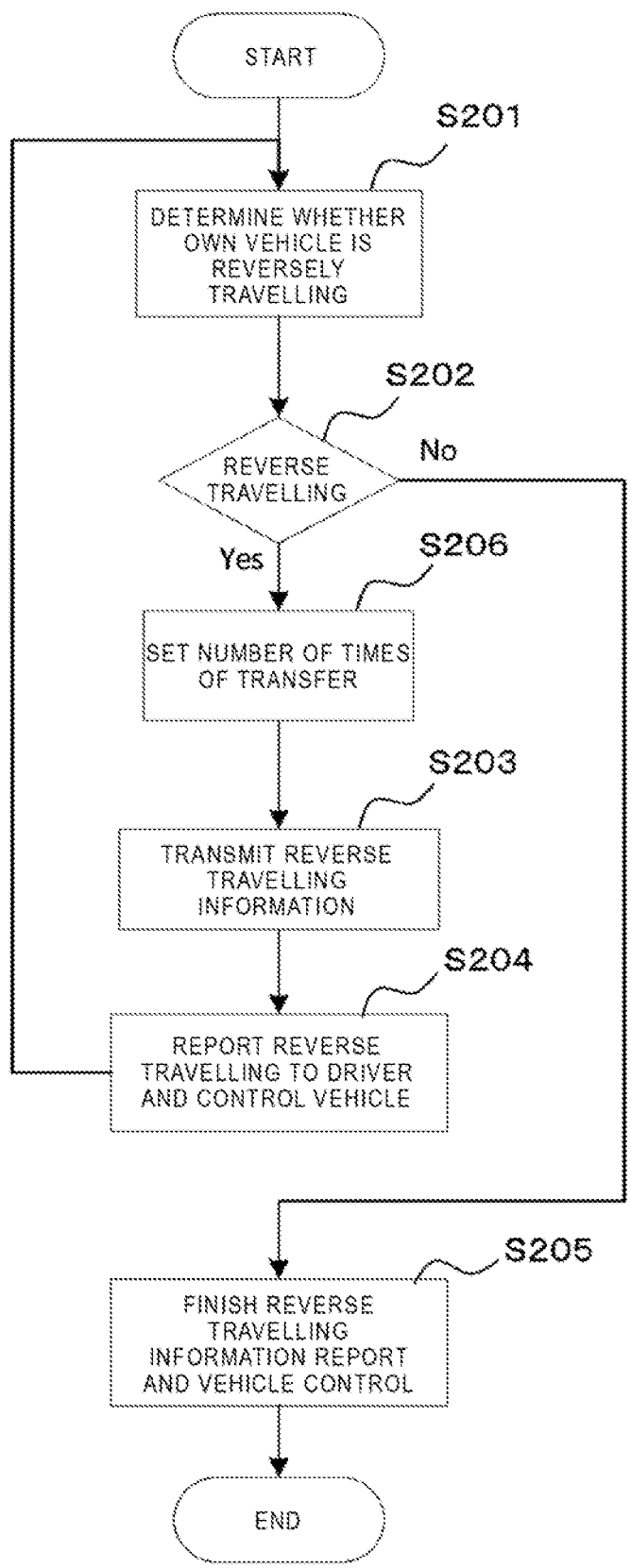
FIG. 6 is a flowchart for explaining operation of the reverse travelling preventing device according to the second embodiment of the present invention.

First, in step S201 in FIG. 6, the reverse travelling detection unit 10 determines whether or not the own vehicle is travelling reversely, on the basis of road map information and information about change in the present position of the own vehicle in the navigation device 2. In step S202, if the reverse travelling detection unit 10 determines that the own vehicle is travelling reversely, the process proceeds to step S206, and the transfer number-of-times setting unit 16 sets the number of times of transfer to a predetermined setting value. Then, the process proceeds to step S203. In step S203, the inter-vehicle communication signal transmission unit 11 transmits, to another vehicle, information indicating that the own vehicle is travelling reversely, and the number of times of transfer together. Further, in step S204, the control signal output unit 12 causes the display 3 to operate to notify a driver that the own vehicle is travelling reversely, and controls the vehicle drive unit 4 to stop or decelerate the vehicle so as to avoid a risk of collision or the like.

Thereafter, the process returns to step S201 to repeat operation for determining whether or not the own vehicle is travelling reversely.

On the other hand, in step S202, if the reverse travelling detection unit 10 determines that there is no reverse travelling information, the process proceeds to step S205, and the control signal output unit 12 stops the output signal to stop operation of the display 3 and controls the vehicle drive unit 4 to keep a normal driving state.

Figure 7:
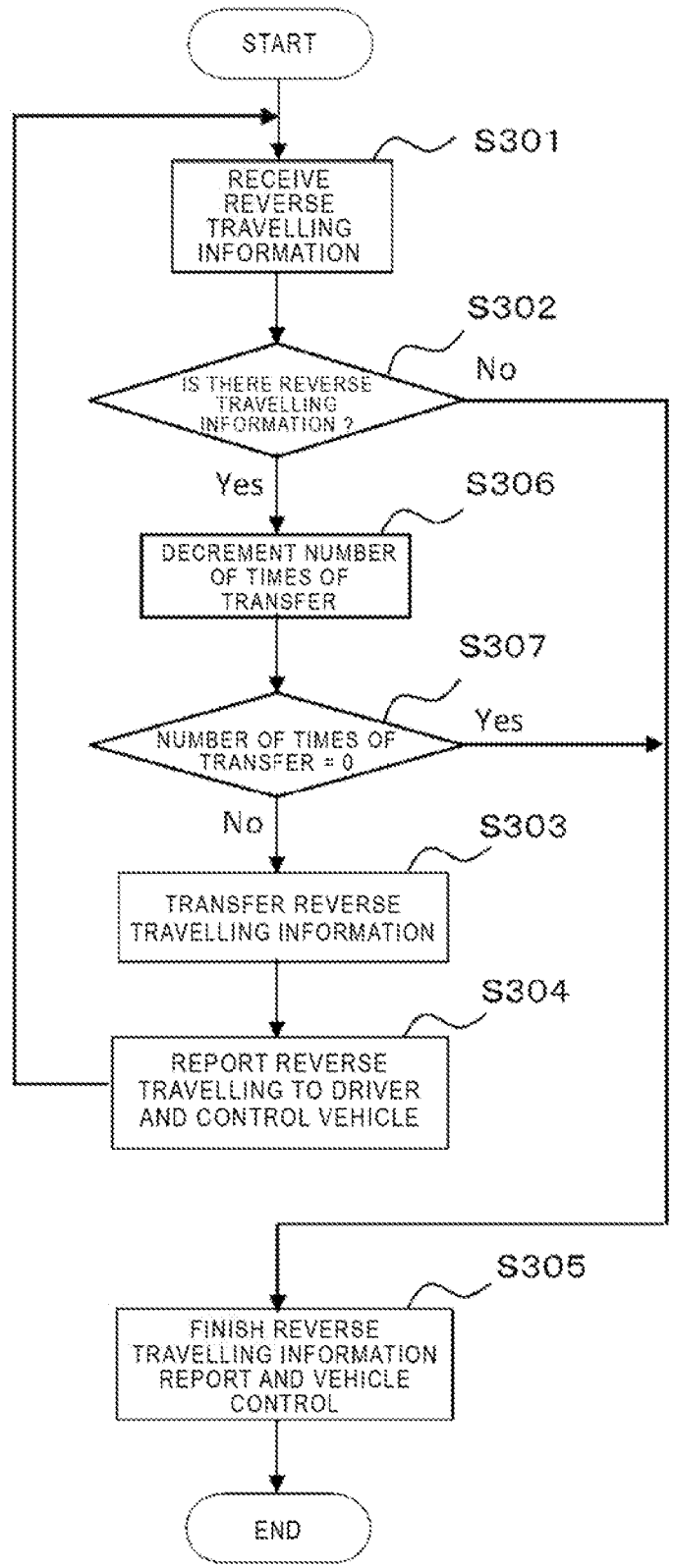
FIG. 7 is a flowchart for explaining another operation of the reverse travelling preventing device according to the second embodiment of the present invention.

Next, the case where another vehicle is travelling reversely will be described with reference to FIG. 7.

First, when another vehicle is travelling reversely, in step S301, reverse travelling information transmitted from the inter-vehicle communication signal transmission unit 11 of the other vehicle is received by the inter-vehicle communication signal reception unit 13 of the own vehicle, and the inter-vehicle communication signal reception unit 13 determines whether or not there is reverse travelling information. In step S302, if the inter-vehicle communication signal reception unit 13 determines that there is reverse travelling information, the process proceeds to step S306, and the transfer number-of-times decrementing unit 17 detects the number of times of transfer and decrements the number of times of transfer by 1.

Next, in step S307, whether or not the number of times of transfer in the transfer number-of-times decrementing unit 17 is 0 is determined. If the number of times of transfer is not 0, the process proceeds to step S303, and the inter-vehicle communication signal transfer unit 14 transfers, to a third-party other vehicle, information indicating that the other vehicle is travelling reversely, together with information about the number of times of transfer.

Next, in step S304, the control signal output unit outputs a signal indicating the reverse travelling information, to the display 3, to notify a driver of the own vehicle that the other vehicle is travelling reversely, and controls the vehicle drive unit 4 to stop or decelerate the vehicle, so as to avoid a risk of collision or the like.

Thereafter, the process returns to step S301 to repeat operation from step S301 to step S304.

On the other hand, in step S302, if the inter-vehicle communication signal reception unit 13 determines that there is no reverse travelling information, or in step S307, if it is determined that the number of times of transfer in the transfer number-of-times decrementing unit 17 is 0, the process proceeds to step S305, and the control signal output unit 15 stops the output signal to stop operation of the display 3, and controls the vehicle drive unit 4 to keep a normal driving state.

As described above, in the second embodiment, the predetermined number of times of transfer is transmitted in addition to reverse travelling information, and the received number of times of transfer is decremented and whether or not transfer is needed is determined. Thus, unnecessary communication is prevented, whereby unnecessary consumption of a communication resource can be avoided.

Third Embodiment

Figure 8:
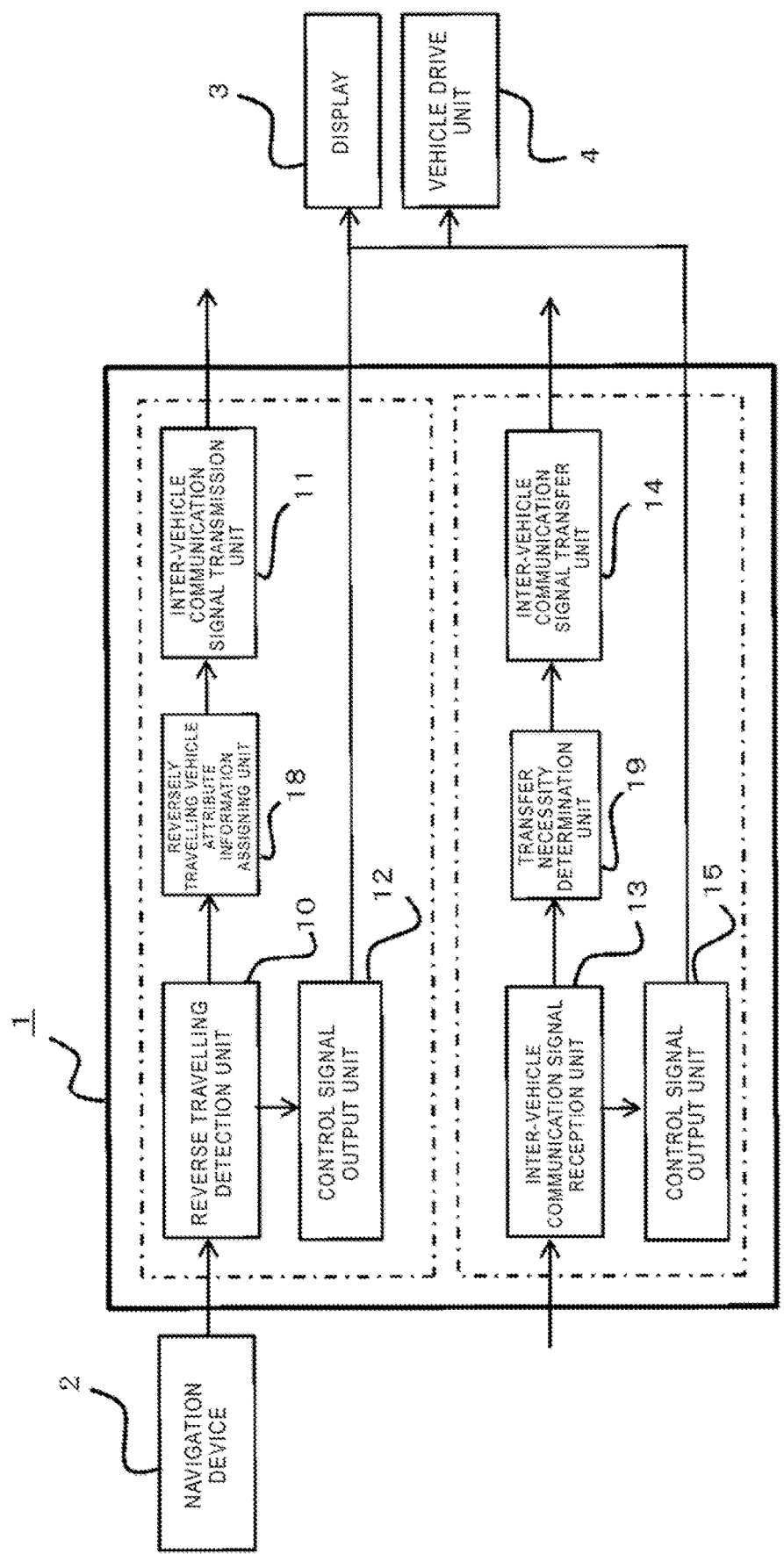
FIG. 8 is a block diagram showing a schematic configuration of a reverse travelling preventing device according to the third embodiment of the present invention.

FIG. 8 is a block diagram showing a schematic configuration of a reverse travelling preventing device according to the third embodiment of the present invention.

In FIG. 8, the same components as those in FIG. 1 are denoted by the same reference characters, and the description thereof is omitted.

In the third embodiment, as compared to the first embodiment, the following two units are added: a reversely travelling vehicle attribute information assigning unit 18 which, when the reverse travelling detection unit 10 has detected reverse travelling, assigns information about the position and/or orientation of the reversely travelling vehicle, to information indicating that the reversely travelling vehicle exists; and a transfer necessity determination unit 19 which, when information indicating that a reversely travelling vehicle exists is received, detects the information about the position and/or on orientation of the reversely travelling vehicle, which is assigned to the reverse travelling information, and determines whether or not there is a risk that the own vehicle and another vehicle travelling around the own vehicle might collide with the reversely travelling vehicle, thereby determining whether or not it is necessary to transfer the reverse travelling information.

For example, in the case where the maximum transmission distance in wireless communication by the moving object information communication device 1 is 300 m and it is determined that the reversely travelling vehicle is present rearward of the own vehicle by 300 m or more on the basis of attribute information about the reversely travelling vehicle and information about the position and/or orientation of the own vehicle, not only the own vehicle but also a vehicle travelling in a range in which wireless transmission can be performed from the own vehicle can be regarded as having already passed by the reversely travelling vehicle. Thus, since there is no vehicle that should be alerted via wireless transmission, it is possible to determine that the reverse travelling information need not be transferred.

In addition, in the case where the reversely travelling vehicle is travelling on an expressway extending on bridge piers and the own vehicle is travelling on a general road at a lower position, the reversely travelling vehicle is very unlikely to appear on a travelling path of the own vehicle or a nearby vehicle travelling on the general road. Therefore, if position information is included in the reverse travelling information, it is possible to similarly determine that the reverse travelling information need not be transferred to a nearby vehicle travelling on the general road.

Figure 9:
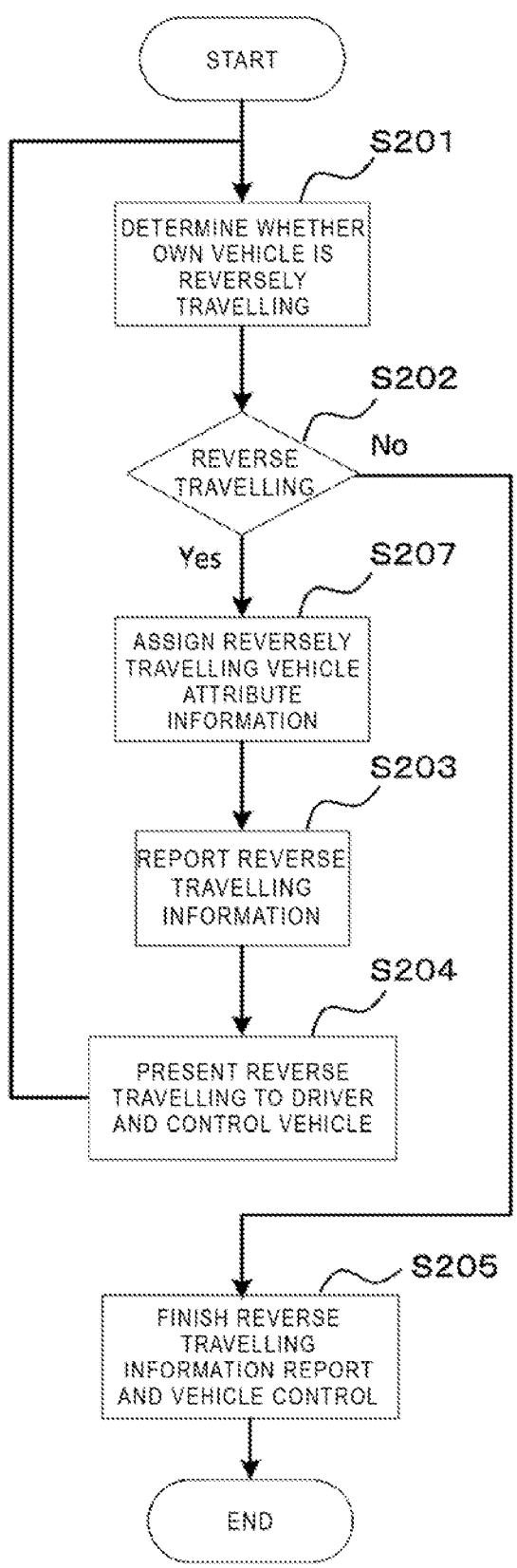
FIG. 9 is a flowchart for explaining operation of the reverse travelling preventing device according to the third embodiment of the present invention.

That is, in a flowchart shown in FIG. 9, step S207 is added, in which the reversely travelling vehicle attribute information assigning unit 18 assigns, to the reverse travelling information, reversely travelling vehicle attribute information indicating the position and/or orientation of the reversely travelling vehicle, and the resultant information is transmitted to another vehicle.

Figure 10:
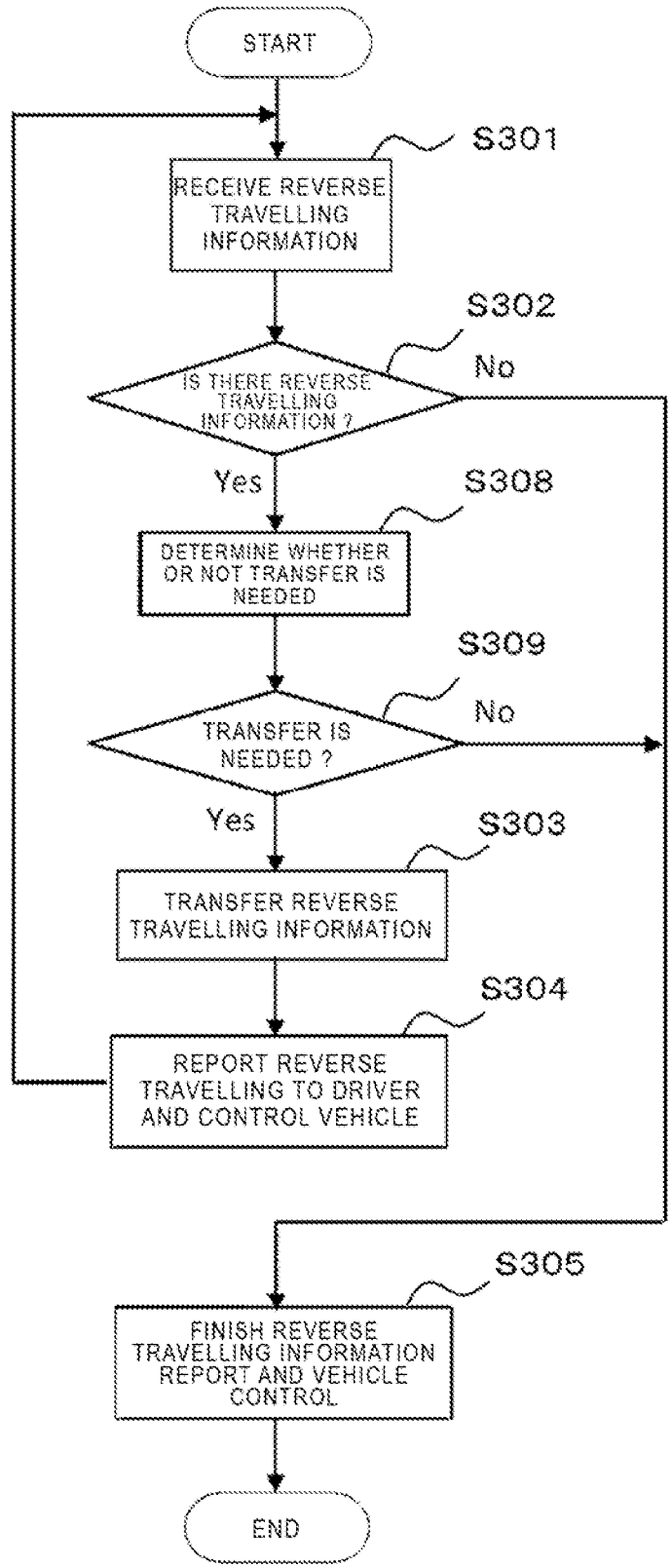
FIG. 10 is a flowchart for explaining another operation of the reverse travelling preventing device according to the third embodiment of the present invention.

On the other hand, when the inter-vehicle communication signal reception unit 13 has received the reverse travelling information including the reversely travelling vehicle attribute information, in step S308 shown in FIG. 10, the transfer necessity determination unit 19 determines whether or not it is necessary to transfer the reverse travelling information on the basis of the reversely travelling vehicle attribute information. If it is necessary to transfer the reverse travelling information (step S309), the process proceeds to step S303, in which it is possible to notify a third-party other travelling vehicle of the reverse travelling information via the inter-vehicle communication signal transfer unit 14, thereby causing the third-party vehicle to avoid a risk of collision or the like. On the other hand, if it is not necessary to transfer the reverse travelling information, the process proceeds to step S305 to finish the vehicle control.

The configuration of the third embodiment as described above makes it possible to prevent transfer of information to a vehicle that does not need reverse travelling information, thereby enabling efficient usage of a wireless resource and enabling precise transfer to a vehicle that needs reverse travelling information.

Fourth Embodiment

Figure 11:
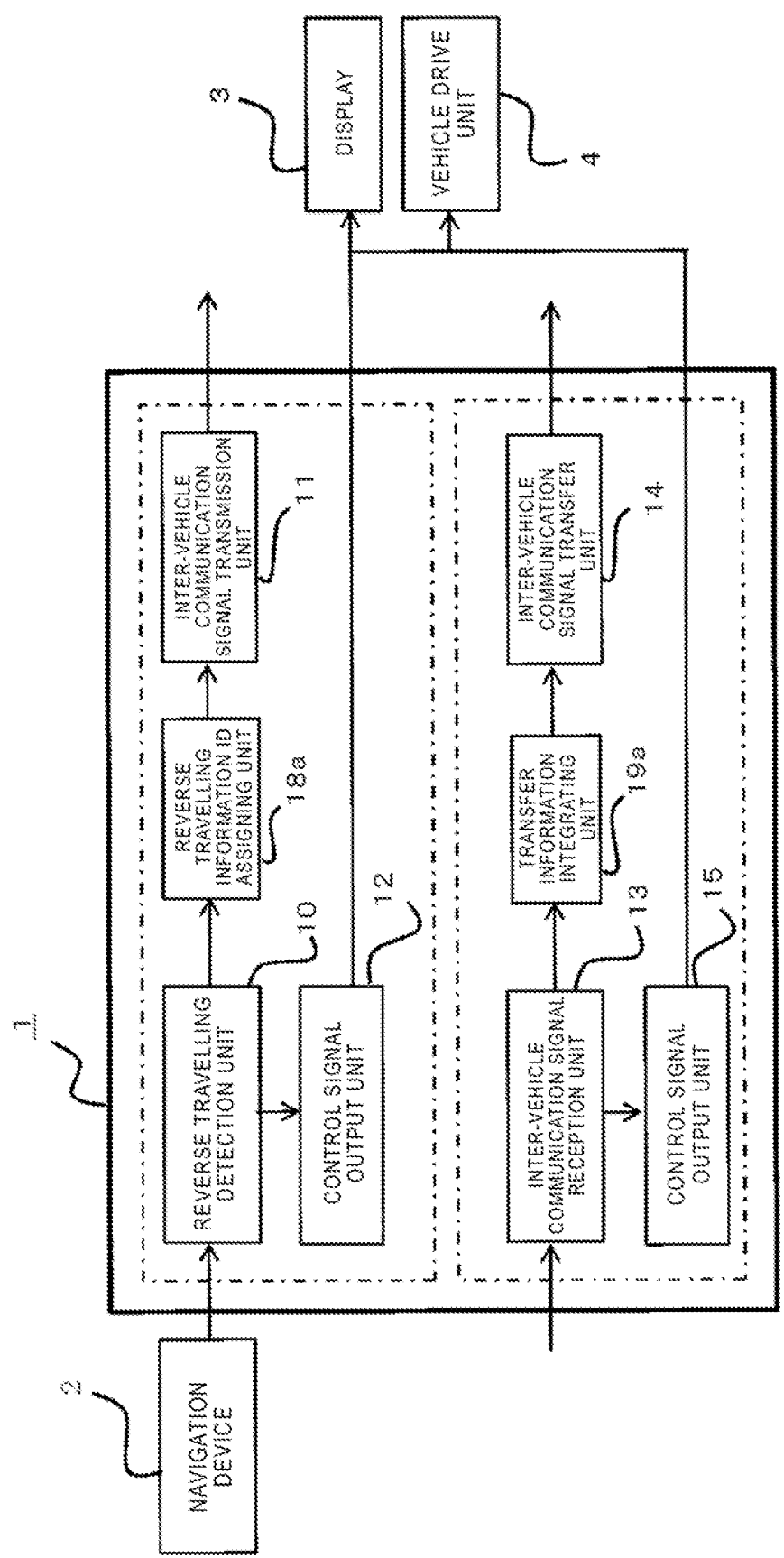
FIG. 11 is a block diagram showing a schematic configuration of a reverse travelling preventing device according to the fourth embodiment of the present invention.

FIG. 11 is a block diagram, showing a schematic configuration of a reverse travelling preventing device according to the fourth embodiment of the present invention.

In FIG. 11, the same components as those in FIG. 1 are denoted by the same reference characters, and the description thereof is omitted.

In the fourth embodiment, as compared to the first embodiment, a reverse travelling information ID assigning unit 18a is added on the transmission side, and a transfer information integrating unit 19a is added on the reception side.

The reverse travelling information ID assigning unit 19a assigns, to reverse travelling information, an ID (identification) for identifying the reverse travelling information. The reverse travelling information ID is assigned such that different IDs are assigned to different reversely travelling vehicles. It is noted that the same reverse travelling information ID is not always assigned to the same reversely travelling vehicle.

On the other hand, when plural pieces of reverse travelling information having the same reverse travelling information ID have been received within a predetermined period, the transfer information integrating unit 19a integrates these pieces of information and the integrated information is transferred.

Figure 12:
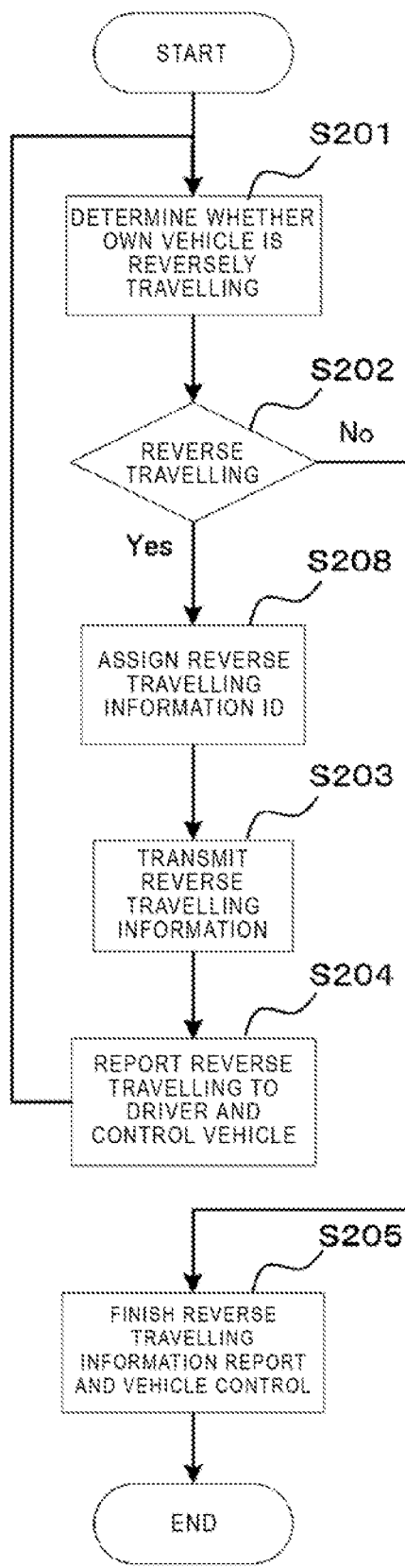
FIG. 12 is a flowchart for explaining operation of the reverse travelling preventing device according to the fourth embodiment of the present invention.

That is, in a flowchart shown in FIG. 12, step S208 is added, in which the reverse travelling information ID assigning unit 18a assigns a reverse travelling information ID to reverse travelling information, and the resultant information is transmitted to another vehicle.

Figure 13:
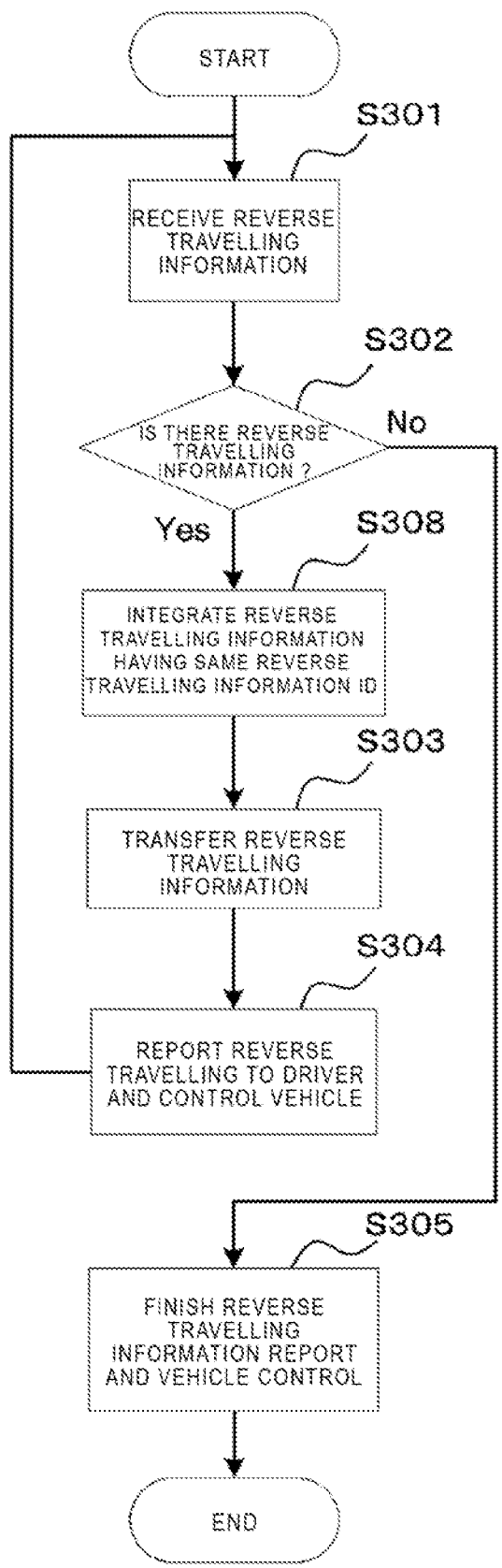
FIG. 13 is a flowchart for explaining another operation of the reverse travelling preventing device according to the fourth embodiment of the present invention.

On the other hand, when the inter-vehicle communication signal reception unit 13 has received reverse travelling information including reverse travelling information IDs, in step S300 shown in FIG. 13, the transfer information integrating unit 19a integrates the reverse travelling information IDs and the resultant information is transferred via the inter-vehicle communication signal transfer unit 14.

For example, in the case where the reverse travelling information includes the number of times of transfer, it is possible to select and transfer information that includes a larger number of times of transfer or a smaller number of times of transfer, while discarding the other reverse travelling information.

In the case where the reverse travelling information includes information about the position and/or orientation, it is possible to determine more advanced information as the latest information and transfer the same, while discarding the ether reverse travelling information.

The configuration of the fourth embodiment as described above makes it possible to collectively transfer information indicating the same reversely travelling vehicle, thereby enabling efficient usage of a wireless resource and enabling precise transmission to a vehicle that needs reverse travelling information.

As the display 3 in the above embodiments, a display using a lamp for indicating that "the vehicle is travelling reversely" or "there is a vehicle travelling reversely", flashing of a hazard lamp, headlight flashing in which a headlight is lit a plurality of times, or the like, may be used. Alternatively, reverse travelling information may be reported with an alarm by voice.

As described above, the present invention enables transfer of reverse travelling information to travelling vehicles over a broad range, and thereby can prevent occurrence of an accident.

Various modifications and alterations or this invention will be apparent to those skilled in the art without departing from the scope and spirit of this invention, and it should be understood that this is not limited to the illustrative embodiments set forth herein.

What is claimed is:

1. A reverse travelling preventing device comprising:
a reverse travelling detection unit which detects that an own vehicle is travelling reversely, on the basis of road map information and information about change in a present position of the own vehicle;
an inter-vehicle communication signal transmission unit which transmits reverse travelling information of the own vehicle to another vehicle when the reverse travelling detection unit has detected reverse travelling;
a control signal output unit which, on the basis of output from the reverse travelling detection unit, generates a control signal and controls a display and a vehicle drive unit;
an inter-vehicle communication signal reception unit which receives reverse travelling information from another vehicle;
an inter-vehicle communication signal transfer unit which transfers information indicating that the other vehicle is travelling reversely, on the basis of output from the inter-vehicle communication signal reception unit;
a control signal output unit which, on the basis of output from the inter-vehicle communication signal reception unit, generates a control signal and controls the display and the vehicle drive unit; and
a transfer necessity determination unit which, on the basis of information about a position and an orientation of a reversely travelling vehicle received by the inter-vehicle communication signal reception unit, determines whether or no there is a risk of collision with the reversely travelling vehicle, wherein, by the transfer necessity determination unit, when there is no risk of collision with the reversely travelling vehicle, transfer of the reverse travelling information is prevented.

2. The reverse travelling preventing device according to claim 1, further comprising:

a transfer number-of-times setting unit which sets a number of times of transfer at a predetermined value when the reverse travelling detection unit has detected reverse travelling, wherein information about the number of times of transfer of the transfer number-of-times setting unit is transmitted in addition to reverse travelling information; and a transfer number-of-times decrementing unit which decrements the number of times of transfer received by the inter-vehicle communication signal reception unit, wherein whether or not it is necessary to transfer reverse travelling information is determined on the basis of information about the decremented number of times of transfer.

3. The reverse travelling preventing device according to claim 2, wherein the display is one of a display lamp, a hazard lamp, and a flashing headlight for reporting reverse travelling.

4. The reverse travelling preventing device according to claim 1, further comprising:

a reversely travelling vehicle attribute information assigning unit which assigns information about a position and an orientation of a reversely travelling vehicle when the reverse travelling detection unit has detected reverse travelling, wherein the information assigned by the reversely travelling vehicle attribute information assigning unit is transmitted in addition to reverse travelling information.

5. The reverse travelling preventing device according to claim 4, wherein the display is one of a display lamp, a hazard lamp, and a flashing headlight for reporting reverse travelling.

6. The reverse travelling preventing device according to claim 1, further comprising:

a reverse travelling information ID assigning unit which assigns a reverse travelling information ID when the reverse travelling detection unit has detected reverse travelling, wherein the information assigned by the reverse travelling information ID assigning unit is transmitted in addition to the reverse travelling information; and a transfer information integrating unit which, when plural pieces of reverse travelling information having a reverse travelling information ID received by the inter-vehicle communication signal reception unit are received, integrates the plural pieces of reverse travelling information, wherein the reverse travelling information integrated by the transfer information integrating unit is transferred.

7. The reverse travelling preventing device according to claim 6, wherein the display is one of a display lamp, a hazard lamp, and a flashing headlight for reporting reverse travelling.

8. The reverse travelling preventing device according to claim 1, wherein the display is one of a display lamp, a hazard lamp, and a flashing headlight for reporting reverse travelling.

9. A reverse travelling preventing system comprising:

the reverse travelling preventing devices according to claim 1, provided to a plurality of moving objects, wherein reverse travelling information is transferred among the plurality of moving objects.

10. A reverse travelling preventing system comprising:

the reverse travelling preventing devices according to claim 2, provided to a plurality of moving objects, wherein reverse travelling information is transferred among the plurality of moving objects.

11. A reverse travelling preventing system comprising:

the reverse travelling preventing devices according to claim 4, provided to a plurality of moving objects, wherein reverse travelling information is transferred among the plurality of moving objects.

12. A reverse travelling preventing system comprising:

the reverse travelling preventing devices according to claim 6, provided to a plurality of moving objects, wherein reverse travelling information is transferred among the plurality of moving objects.

* * * * *